(12) United States Patent
Tasiopoulos et al.

(10) Patent No.: US 11,024,901 B2
(45) Date of Patent: Jun. 1, 2021

(54) BATTERY COOLING PLATE WITH INTEGRATED AIR VENTS

(71) Applicant: Hanon Systems, Daejeon (KR)

(72) Inventors: James Tasiopoulos, West Bloomfield, MI (US); Kastriot Shaska, Northville, MI (US); Kurt Puterbaugh, Belleville, MI (US)

(73) Assignee: HANON SYSTEMS, Daejeon (KR)

( * ) Notice: Subject to any disclaimer, the term of this patent is extended or adjusted under 35 U.S.C. 154(b) by 355 days.

(21) Appl. No.: 15/875,079

(22) Filed: Jan. 19, 2018

(65) Prior Publication Data

US 2019/0229384 A1 Jul. 25, 2019

(51) Int. Cl.
| | |
|---|---|
| *H01M 10/6556* | (2014.01) |
| *H01M 10/613* | (2014.01) |
| *H01M 10/647* | (2014.01) |
| *H01M 10/6554* | (2014.01) |
| *H01M 10/643* | (2014.01) |
| *H01M 10/6567* | (2014.01) |
| *H01M 50/30* | (2021.01) |
| *H01M 10/625* | (2014.01) |

(52) U.S. Cl.
CPC ..... *H01M 10/6556* (2015.04); *H01M 10/613* (2015.04); *H01M 10/625* (2015.04); *H01M 10/643* (2015.04); *H01M 10/647* (2015.04); *H01M 10/6554* (2015.04); *H01M 10/6567* (2015.04); *H01M 50/30* (2021.01); *H01M 2220/20* (2013.01)

(58) Field of Classification Search
CPC ......... H01M 10/6556; H01M 10/6567; H01M 2/12; H01M 10/613; H01M 10/625; H01M 10/647; H01M 10/6554; H01M 10/6561; H01M 10/643; H01M 2220/20; H01M 50/30; H01M 10/6566; H01M 10/6563; Y02E 60/10; Y02T 10/70; B60L 58/26; B60Y 2200/91; B60Y 2200/92
See application file for complete search history.

(56) References Cited

U.S. PATENT DOCUMENTS

| | | | | |
|---|---|---|---|---|
| 2,410,952 | A | * 11/1946 | Lighton | .............. H01M 10/613 |
| | | | | 429/120 |
| 2012/0107663 | A1 | * 5/2012 | Burgers | .................... F28F 3/12 |
| | | | | 429/120 |
| 2013/0192807 | A1 | 8/2013 | DeKeuster | |
| 2017/0149103 | A1 | * 5/2017 | Yang | ................. H01M 10/6556 |

FOREIGN PATENT DOCUMENTS

| | | |
|---|---|---|
| DE | 102011103993 A1 | 12/2012 |
| JP | 2013030384 A | 2/2013 |
| KR | 20160149604 A | 12/2016 |
| KR | 20170098966 A | 8/2017 |
| WO | WO2013/018151 * 2/2013 | .............. H01M 2/10 |

OTHER PUBLICATIONS

Machine translation of WO2013/018151, Itoi et al., 2013 (Year: 2013).*

* cited by examiner

*Primary Examiner* — Kwang Han
(74) *Attorney, Agent, or Firm* — Shumaker, Loop & Kendrick, LLP; James D. Miller

(57) ABSTRACT

A cooling system for cooling battery cells includes a plate assembly defining a chamber. The chamber is configured to receive a fluid therein. A plurality of apertures extend through the plate assembly. Each of the plurality of apertures is configured to align with a cell vent of one of the battery cells.

15 Claims, 4 Drawing Sheets

BATTERY COOLING PLATE WITH INTEGRATED AIR VENTS

FIELD OF THE INVENTION

The invention relates to a cooling system for battery modules including a cooling plate with integrated air vents.

BACKGROUND

As is commonly known, vehicles employing electric power for at least a portion of a driven force may employ battery cells. Vehicles employing battery cells are electric vehicles, hybrid electric vehicles, plug in electric vehicles, battery electric vehicles, fuel cell electric vehicles, and plug-in hybrid vehicles, for example.

The battery cells commonly utilize a lithium-ion chemistry and are typically packaged into cylindrical or prismatic casings to form the battery module. As the battery cells are charged and discharged, heat is generated by current flowing through the battery cells. Additionally, heat may be added to the cells by exothermic chemical reactions and by ambient temperatures through conduction, convection, and/or radiation. The additional heat increases the temperature of the battery cells which negatively affects the an efficiency and a longevity of the battery cells. For example, increased temperatures can lead to distortion, swelling, and short circuiting.

To prolong a life of the battery cells, it is desired to cool the battery cells. Examples of battery cooling systems include cooling plates positioned adjacent to the battery cells. The cooling plates include a cooling fluid flowing therethrough. An example of a cooling plate is shown and described in U.S. Pat. Appl. Pub. No. 2013/0192807, the disclosure of which is hereby incorporated by reference herein in its entirety. However, it is desired to vent gases caused by thermal runaway of the battery cells or the exothermic reaction caused by increases in temperature from the battery cells. Each of the battery cells has vents formed therein for venting the gases. Disadvantageously, the cooling plates known in the art do not include vent holes to properly vent air from the battery cells.

Accordingly, there exists a need in the art for a battery cooling plate with air vents formed therein to efficiently cool battery cells.

SUMMARY OF THE INVENTION

In concordance with the instant disclosure a battery cooling plate with air vents formed therein to efficiently cool battery cells is discovered.

According to a first embodiment of the disclosure, a cooling system for cooling battery cells is disclosed. The cooling system includes a plate assembly defining a chamber. The chamber is configured to receive a fluid therein. A plurality of apertures extend through the plate assembly. Each of the plurality of apertures is configured to align with a cell vent of one of the battery cells.

According to another embodiment of the disclosure, a battery module assembly includes a plurality of battery cells. Each of the plurality of battery cells having a cell vent formed therein. A plate assembly defines a chamber. The chamber receives a fluid therein. A plurality of apertures extend through the plate assembly. Each of the plurality of apertures is configured to align with a cell vent of one of the battery cells.

According to yet another embodiment of the disclosure, a battery module assembly is disclosed. The battery module assembly includes a plurality of battery cells. Each of the plurality of battery cells has a cell vent formed therein. A first cooling plate engages the plurality of battery cells and as a plurality of apertures formed therethrough. A second cooling plate cooperates with the first cooling plate to form a plurality of flow channels for receiving a fluid intermediate the first cooling plate and the second cooling plate. The second cooling plate includes a plurality of apertures formed therethrough. Each of the plurality of apertures of the second cooling plate and each of the plurality of apertures of the first cooling plate align with the cell vent of one of the plurality of battery cells.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, the term "to a considerable degree" as a person skilled in the art would recognize in view of the specification and drawings.

The term electric vehicle used herein is defined to include vehicles employing electric power for all or a portion of the vehicle driven force. The electric vehicle can include hybrid electric vehicles, plug-in electric vehicles, all electric or battery electric vehicles, plug-in hybrid vehicles, fuel cell electric vehicles, or other vehicle employing electric power now known or later developed.

Figure 1:
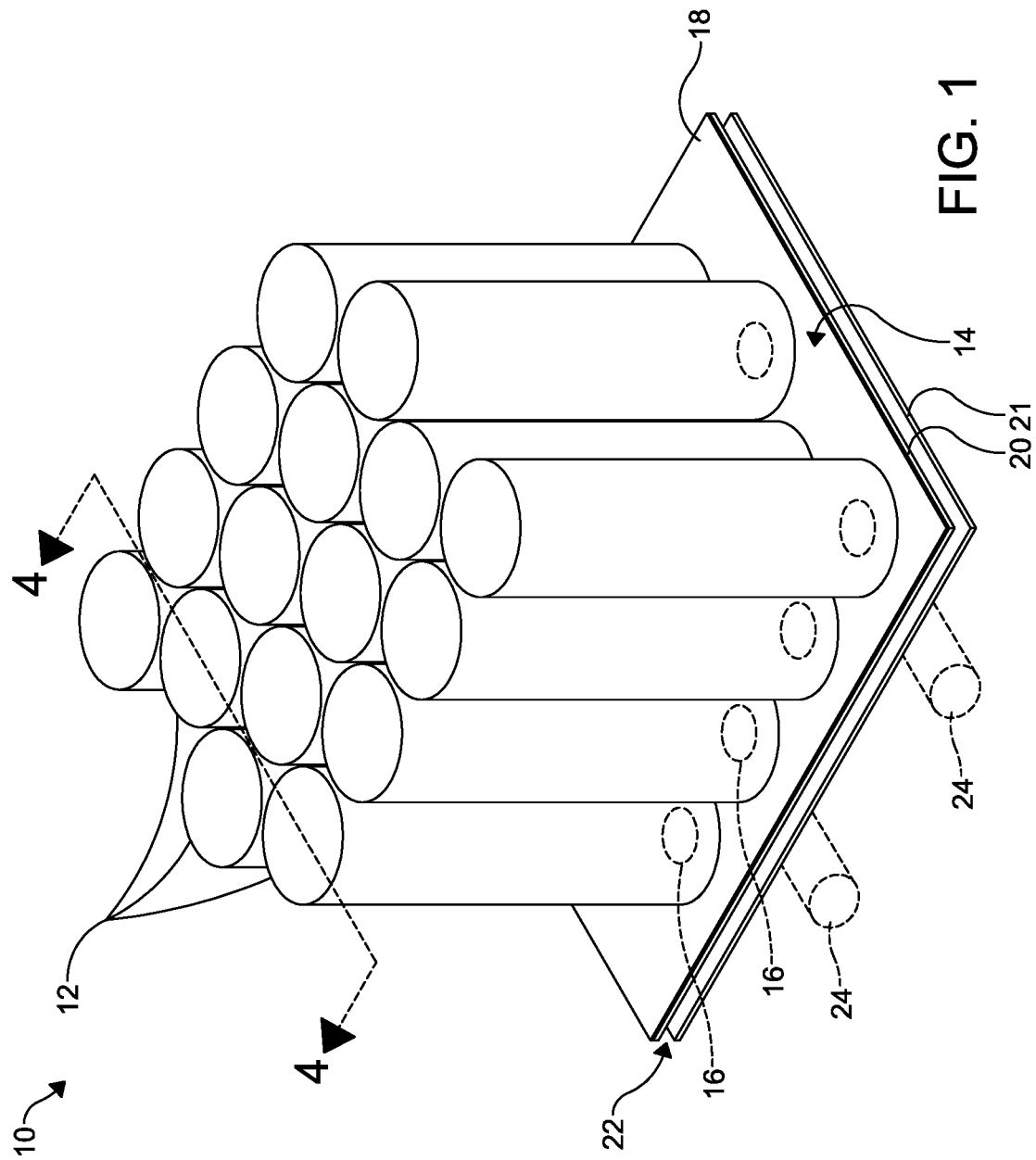
FIG. 1 is a top perspective view of a battery module assembly according to an embodiment of the disclosure.
Figure 2:
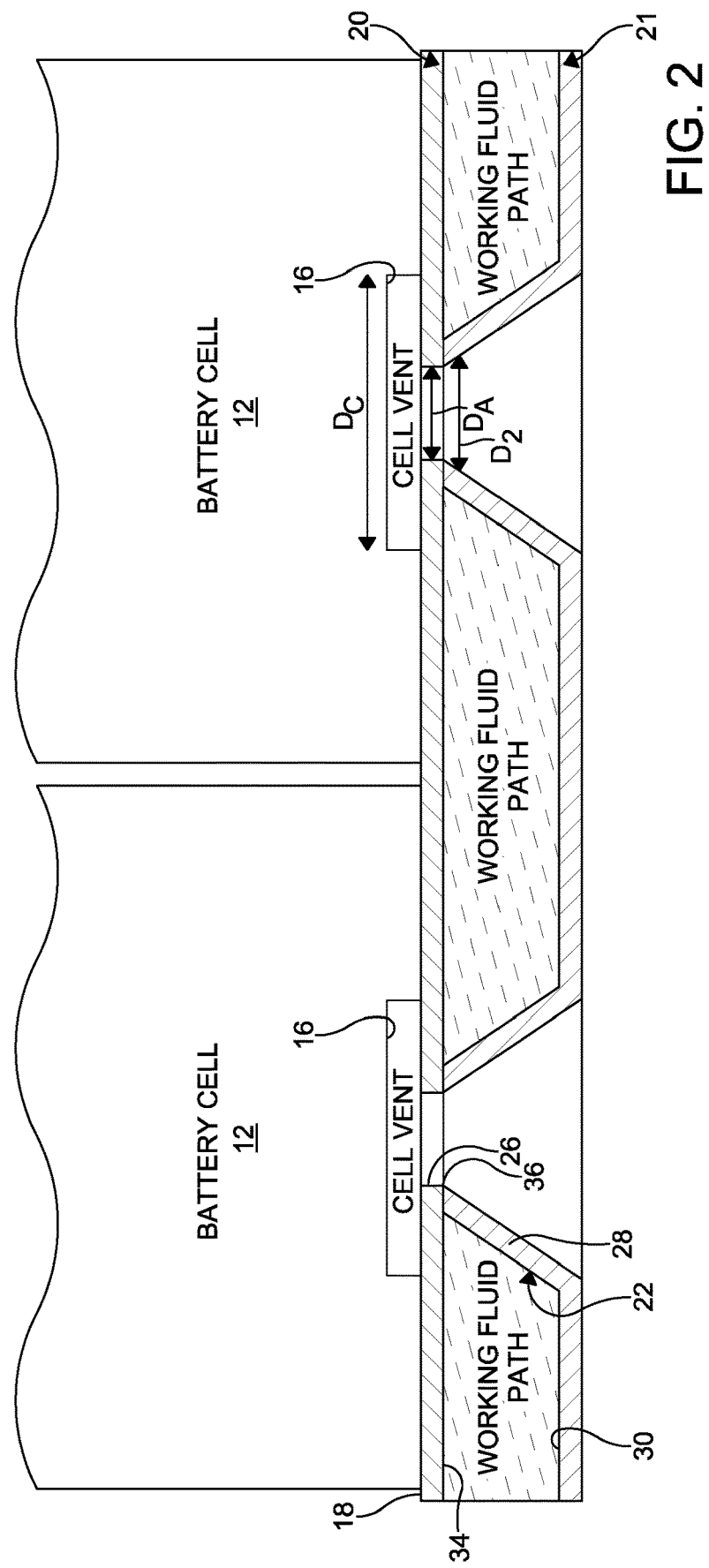
FIG. 2 is an enlarged fragmentary schematic cross-sectional front elevational view of battery cells and a cooling system of the battery module assembly of FIG. 1.
Figure 3:
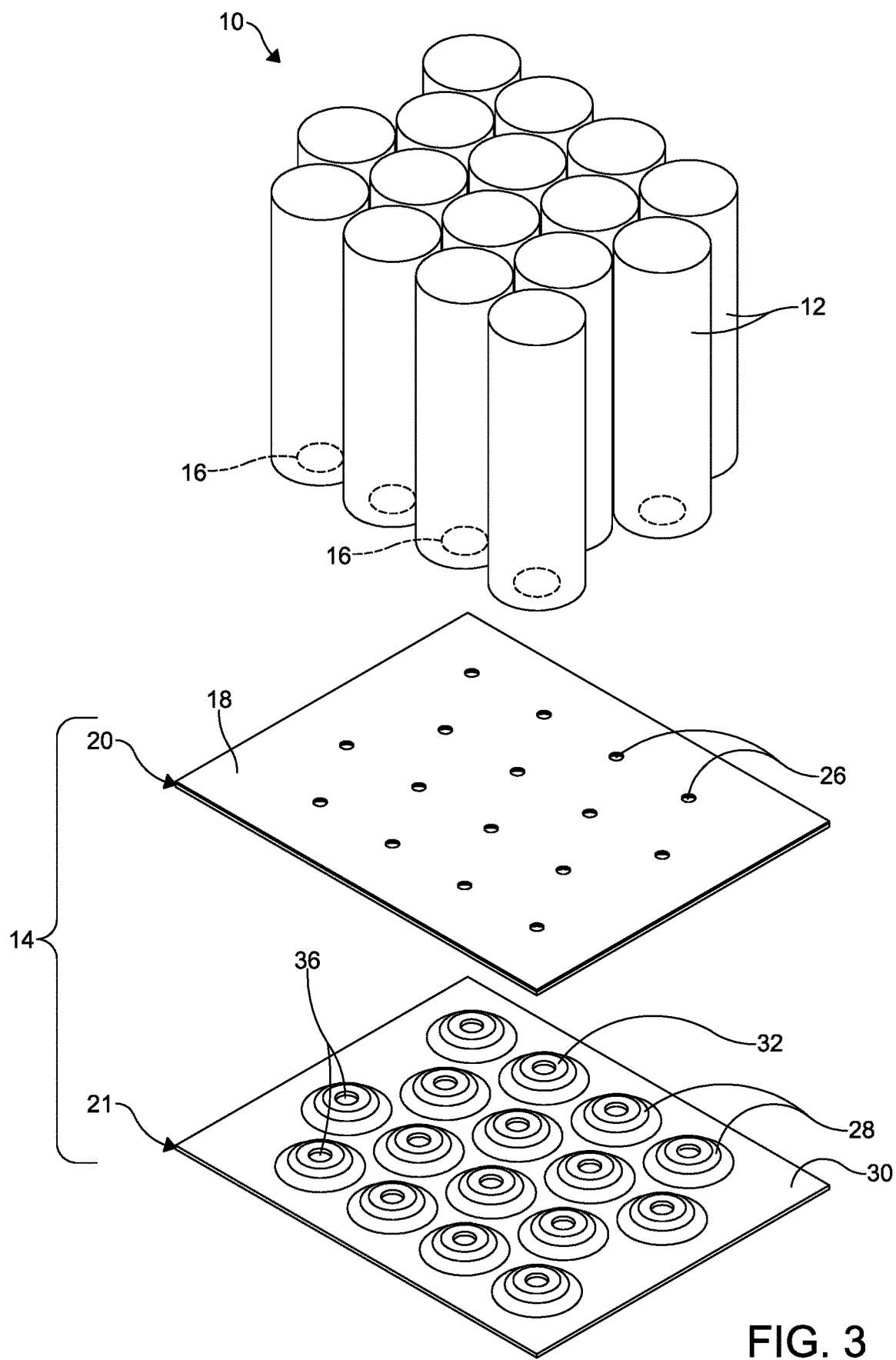
FIG. 3 is an exploded top perspective view of the battery module assembly of FIG. 1.
Figure 4:
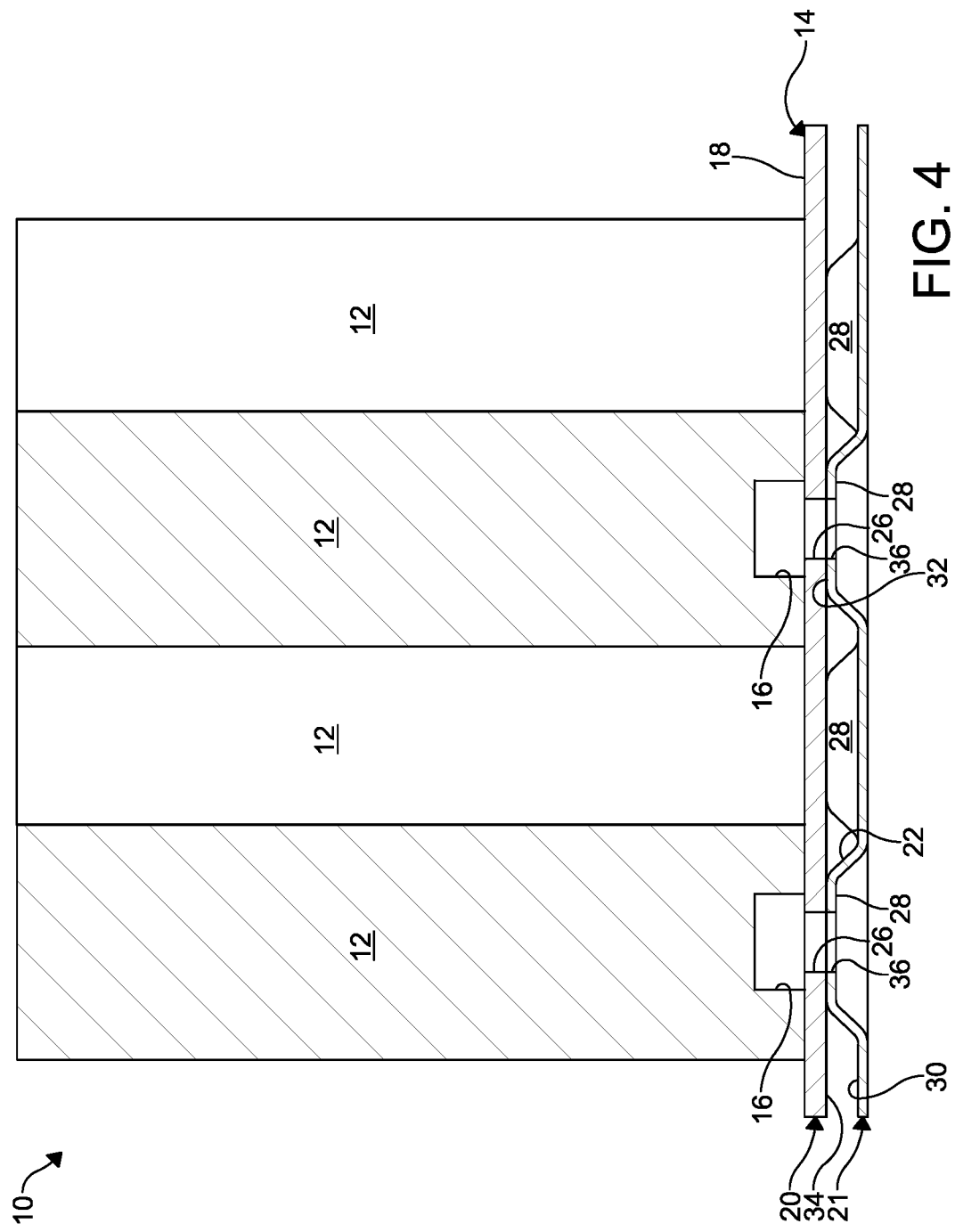
FIG. 4 is a cross-sectional view of the battery module assembly of FIG. 1, taken through line 4-4.

As shown in FIGS. 1-4, a battery module assembly 10 includes a plurality of individual battery cells 12 and a cooling system 14 adjacent to or coupled to the battery cells 12. Each of the battery cells 12 includes a cell vent 16 formed therein configured for releasing air therefrom. In the embodiment illustrated, each of the battery cells 12 is cylindrical in shape. However, it is understood the battery cells 12 can have other shapes depending on the application. For example, the battery cells 12 can be prismatic in form. It is also understood, the battery cells 12 can be contained within a housing (not shown). Additionally, the battery cells 12 are arranged in a plurality of staggered rows. However, the battery cells 12 can be arranged in a plurality of aligned rows, a circular pattern, an irregular pattern, or any other pattern, as desired.

The cooling system 14 has an external surface 18 in contact with the battery cells 12. Advantageously, the external surface 18 of the cooling system 14 contacts the battery cells 12 at an end of the battery cells 12 where the cell vents 16 are formed.

The cooling system 14 is formed by a pair of cooling plates designated as a first cooling plate 20 and a second cooling plate 21. The cooling plates 20, 21 define a chamber 22 for receiving a working fluid therein from a fluid source (not shown). The working fluid is conveyed to and from the chamber 22 through headers 24, which are schematically shown for illustrative purposes. The headers 24 can be coupled to the cooling plates 20, 21 on any side thereof. The working fluid is a refrigerant or glycol, for example. Although, the working fluid can be any other cooling fluid, as desired.

The first cooling plate 20 includes the external surface 18, a fluid surface 34, and a plurality of apertures 26 extending entirely through a thickness of the first cooling plate 20. The apertures 26 extend through the cooling plate 20 substantially perpendicular to the external surface 18 of the cooling system 14. The number of apertures 26 depends on the number of cell vents 16 of the battery cells 12. For example, sixteen cell vents 16 are illustrated corresponding to the number of the battery cells 12. Therefore, sixteen of the apertures 26 are formed in the first cooling plate 20. Each of the apertures 26 is substantially aligned with one of the cell vents 16 of the battery cells 12. As used herein, substantially is defined at "to a considerable degree." For example it is desirable for each of the apertures 26 to align with one of the cell vents 16 concentrically. However, due to variances and tolerances in the manufacturing and the assembly of the first cooling plate 20 and the battery cells 12, the apertures 26 may be erratically or non-concentrically aligned. Favorable results have been obtained wherein the apertures 26 have a diameter $D_A$ less than a diameter $D_C$ of the cell vents 16. Advantageously, the smaller diameter $D_A$ of the apertures 26 accommodates manufacturing and assembly variances in spacing and dimensions of each of the battery cells 12 coupled to the cooling system 14 such as variations in dimensions between the apertures 26, variations in dimensions between the cell vents 16, and/or variations in tolerances of either the cell vents 16 or the apertures 26. For example, a distance between a center of adjacent ones of the cell vents 16 may be slightly greater or slightly less than a distance between a center of corresponding adjacent ones of the apertures 26. As a result of the smaller diameters $D_A$ of the apertures 26, the cell vents 16 partially overlap the external surface 18 of the first cooling plate 20. The apertures 26 substantially align with the corresponding cell vents 16 to provide fluid communication from the cell vents 16 to the environment or for recycled use of the gases in another portion of the vehicle.

The second cooling plate 21 includes a plurality of protuberances 28 extending outwardly from a fluid surface 30 of the second cooling plate 21. Each of the protuberances 28 is substantially frustoconical in shape forming a substantially planar surface 32 configured to engage the fluid surface 34 of the first cooling plate 20. However, the protuberances 28 can have other shapes as desired such as cylindrical, cuboidal, or any other shape as desired to engage the fluid surface 34 of the first cooling plate 20. Each of the protuberances 28 has an aperture 36 formed substantially concentrically therethrough. The apertures 36 extend through the second cooling plate 21 substantially perpendicular to the planar surface 32 thereof. A number of protuberances 28 and a number of apertures 36 depend on the number of cell vents 16 of the battery cells 12 and the number of apertures 26 of the first cooling plate 20. For example, sixteen cell vents 16 and sixteen apertures 26 of the first cooling plate 20 are illustrated corresponding to the number of battery cells 12. Therefore, sixteen of the protuberances 28, and sixteen of the apertures 36 are formed in the second cooling plate 21. Each of the apertures 36 of the second cooling plate 21 substantially align with one of the apertures 26 of the first cooling plate 20, and thus, with one of the cell vents 16 of the battery cells 12. As used herein, substantially is defined as "to a considerable degree." A diameter $D_2$ of the apertures 36 of the second cooling plate 21 is substantially equal to the diameter $D_A$ of the apertures 26 of the first cooling plate 20. The apertures 36 substantially align with the corresponding apertures 26 of the first cooling plate 20 and the corresponding cell vents 16 to provide fluid communication from the cell vents 16 to the environment or for recycled use of the gases in another portion of the vehicle.

The cooling plates 20, 21 are coupled to each other by a coupling means such as a brazing, a stamping, or a clamping operation, for example, to form a plate assembly. Although it is understood other coupling means such as bolts, pins, and the like can be employed as desired. The planar surface 32 of each of the protuberances 28 engages the fluid surface 34 of the first cooling plate 20. The chamber 22 is formed intermediate the fluid surface 30 of second cooling plate 21 and the fluid surface 34 of the first cooling plate 20. The working fluid flows through the chamber 22. The protuberances 28 form flow paths for the working fluid to flow through. The cooling plates 20, 21 may be formed from a thermally conductive material such as aluminum or steel, for example. While the figures illustrate the pair of separately formed cooling plates 20, 21, it is understood the cooling plates 20, 21 can be integrally formed as a single unit.

In application, the battery cells 12 are placed in engagement with the external surface 18 of the first cooling plate 20, wherein the cell vents 16 of the battery cells 12 substantially align with the apertures 26 formed through the first cooling plate 20 and the apertures 36 formed in second cooling plate 21. The working fluid is provided to the chamber 22 via the headers 24 to circulate through the chamber 22 around the protuberances 28. The working fluid facilitates cooling of the battery cells 12. Additionally, when the battery cells 12 vent gases caused by high temperatures or thermal runaway, the gases can flow from the battery cells 12 through the apertures 26, 36 and outwardly from the battery module assembly 10 to the environment or for recycled use in another portion of the vehicle.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cooling system for cooling battery cells comprising:
a plate assembly defining a chamber, the chamber configured to receive a fluid therein;
a plurality of apertures extending through the plate assembly, each of the plurality of apertures configured to align with a cell vent of one of the battery cells, wherein the plate assembly includes a first cooling plate and a second cooling plate cooperating with the first cooling plate to form the chamber between the first cooling plate and the second cooling plate, and wherein the second cooling plate includes a plurality of protuberances extending from a surface thereof toward the first cooling plate, the plurality of protuberances engaging a surface of the first cooling plate, and wherein each of the plurality of protuberances is substantially frustoconical in shape; and a pair of headers coupled to the first cooling plate or the second cooling plate in fluid communication with the chamber, wherein the fluid is conveyed to and from the chamber through the pair of headers.

2. The cooling system of claim 1, wherein the first cooling plate is substantially planar and has a plurality of first apertures formed therethrough.

3. The cooling system of claim 2, wherein the second cooling plate has a plurality of second apertures formed therethrough, and wherein the plurality of second apertures of the second cooling plate align with the plurality of first apertures of the first cooling plate to form the plurality of apertures of the plate assembly.

4. The cooling system of claim 3, wherein each of the plurality of second apertures of the second cooling plate is formed through one of the plurality of protuberances.

5. The cooling system of claim 1, wherein each of the plurality of apertures extending through the plate assembly has a diameter less than a diameter of the cell vent of a corresponding one of the battery cells.

6. A battery module assembly comprising:
   a plurality of battery cells, each of the plurality of battery cells having a cell vent formed therein;
   a plate assembly defining a chamber, the chamber receiving a fluid therein;
   a plurality of apertures extending through the plate assembly, each of the plurality of apertures configured to align with a cell vent of one of the battery cells, wherein the plate assembly includes a first cooling plate and a second cooling plate cooperating with the first cooling plate to form the chamber between the first cooling plate and the second cooling plate, and wherein the second cooling plate includes a plurality of protuberances extending from a surface thereof toward the first cooling plate, the plurality of protuberances engaging a surface of the first cooling plate, and wherein each of the plurality of protuberances is substantially frustoconical in shape; and
   a pair of headers coupled to the first cooling plate or the second cooling plate in fluid communication with the chamber, wherein the fluid is conveyed to and from the chamber through the pair of headers.

7. The battery module of claim 6, wherein each of the plurality of battery cells has a cylindrical shape.

8. The battery module of claim 6, wherein each of the plurality of battery cells has a prismatic shape.

9. The battery module of claim 6, wherein the plurality of battery cells is arranged in staggered rows.

10. The battery module of claim 6, wherein the fluid is one of a refrigerant and a glycol.

11. The battery module of claim 6, wherein each of the first cooling plate and the second cooling plate have apertures formed therein.

12. The battery module of claim 6, wherein each of the plurality of apertures has a diameter less than a diameter of the cell vent of the corresponding one of the battery cells.

13. A battery module assembly comprising:
   a plurality of battery cells, each of the plurality of battery cells having a cell vent formed therein;
   a first cooling plate engaging the plurality of battery cells and having a plurality of apertures formed therethrough; and
   a second cooling plate cooperating with the first cooling plate to form a plurality of flow channels for receiving a fluid between the first cooling plate and the second cooling plate, the second cooling plate including a plurality of apertures formed therethrough, each of the plurality of apertures of the second cooling plate and each of the plurality of apertures of the first cooling plate aligning with the cell vent of one of the plurality of battery cells, wherein the second cooling plate includes a plurality of protuberances extending from a surface thereof toward the first cooling plate, the plurality of protuberances engaging a surface of the first cooling plate, and wherein each of the plurality of protuberances is substantially frustoconical in shape; and
   a pair of headers coupled to the first cooling plate or the second cooling plate in fluid communication with the chamber, wherein the fluid is conveyed to and from the chamber through the pair of headers.

14. The battery module of claim 13, wherein a diameter of the plurality of apertures of the first cooling plate and a diameter of the plurality of apertures of the second cooling plate are less than a diameter of the cell vent of a corresponding one of the plurality of battery cells.

15. The battery module of claim 13, wherein each of the plurality of battery cells has one of a cylindrical shape and a prismatic shape.

* * * * *